United States Patent
Cashman

(10) Patent No.: US 6,190,626 B1
(45) Date of Patent: Feb. 20, 2001

(54) DETOXIFYING SPENT ALUMINUM POTLINERS

(76) Inventor: Joseph B. Cashman, P.O. Box 122, Baring, WA (US) 98224

(*) Notice: Under 35 U.S.C. 154(b), the term of this patent shall be extended for 0 days.

(21) Appl. No.: 09/254,000

(22) Filed: Feb. 22, 1999

Related U.S. Application Data

(60) Provisional application No. 60/037,085, filed on Jan. 14, 1997.

(51) Int. Cl.$^7$ ................. C22B 1/00; A62D 3/00; C09K 3/00
(52) U.S. Cl. ............... 423/111; 588/205; 588/224; 588/226; 252/182.32
(58) Field of Search ............ 423/111; 588/205, 588/224, 246; 252/182.32

(56) References Cited

U.S. PATENT DOCUMENTS

| | | | |
|---|---|---|---|
| 4,018,867 | * 4/1977 | Lee | 423/111 |
| 4,560,415 | * 12/1985 | Koh et al. | 106/286.3 |
| 4,973,464 | * 11/1990 | Rickman | 423/119 |
| 5,030,364 | * 7/1991 | Nakane et al. | 23/302 T |
| 5,245,116 | * 9/1993 | Bontron et al. | 423/111 |
| 5,387,738 | * 2/1995 | Beckham et al. | 588/256 |
| 5,470,559 | * 11/1995 | Grolman et al. | 588/246 |
| 5,939,035 | * 8/1999 | Besida et al. | 423/131 |

* cited by examiner

*Primary Examiner*—Steven Bos
(74) *Attorney, Agent, or Firm*—John C. Hammar

(57) ABSTRACT

The method of the present invention detoxifies spent aluminum potliners to remove hazardous cyanides, fluorides, and polynuclear aromatics by reacting crushed potliners with a $CaCl_2$/HCl leach mill solution in the presence of iron. The method produces a solid waste suitable for landfill disposal and a recyclable reaction liquor. The reaction to destroy the polynuclear aromatics preferably occurs at a pH of no more than about 0.2, at about 120° C. and 80 psig following destruction of the cyanides and converting of the fluorides to florspar in an initial oxidation at a lower temperature, lower pressure, and higher pH.

21 Claims, No Drawings

DETOXIFYING SPENT ALUMINUM POTLINERS

REFERENCE TO RELATED APPLICATIONS

The present application claims the benefit of PCT/US98/00789, filed Jan. 12, 1998, which claims the benefit of U.S. Provisional Patent Application 60/037,085, filed Jan. 14, 1997 pending.

TECHNICAL FIELD

The present invention relates to a hydrometallurgical process for detoxifying spent aluminum potliners. The process destroys hazardous cyanides and polynuclear aromatics and converts hazardous fluorides to insoluble florspar to produce a solid waste that can be disposed of in a landfill.

BACKGROUND ART

Aluminum potliners are created in the smelting of aluminum metal and its alloys. They are the liners of the pots into which the molten aluminum is poured. A typical liner lasts about five years. The Pacific Northwest aluminum producers currently annually produce about 50,000–75,000 tons of spent potliners. (The production of aluminum generates about 35 kg of spent potliner per ton of metal.) Spent potliners are currently classified in the U.S. as hazardous waste. They contain significant concentrations of four soluble pollutants, namely, cyanides, fluorides, polynuclear aromatic hydrocarbons (PNAs), and heavy metals (such as lead, beryllium, and cadmium).

A treatment process for spent potliners must be technically feasible at a reasonable cost (with reasonable capital cost). It must produce disposable waste products that comply with all environmental control regulations. It must be robust to tolerate variations in the feed because spent potliners from different sources differ significantly in their makeup (that is, the process should be able to accept widely differing feedstreams rather than be limited to a particular feedstock). All spent aluminum potliners require treatment prior to landfill disposal, so aluminum producers are struggling to find an acceptable treatment process.

Reynold's proposed using a thermal treatment process involving high temperatures in a rotary kiln with the addition of sand and limestone to complex with the fluorides. Comalco proposed using a two-step process involving a calciner to complex the cyanides followed by a hydrometallurgical step to recover the fluorides. Pechiney's SPLIT process introduced ground potliner to a hot airflow vortex rotating at supersonic speeds to destroy the cyanides while reacting the fluorides with an additive to produce a disposable solid waste.

Details for two other spent potliner treatment processes are presented in:

(1) J. Bernier et al., "The LCLL Process - Spent Potlining Recycling Solution," 52nd Annual Conf. of Metallurgists, Quebec, Canada, Aug. 28–Sep. 2, 1993; and
(2) R. Adrien et al., "A Process for Treatment and Recovery of Spent Potliners," Light Metals 1996, The Minerals, Metals, & Materials Soc. (1996) 1261–1263.

I incorporate these articles by reference. The "LCLL process" is Alcan's Low Caustic Leaching and Liming process which involves three steps that require the use of complicated reactors and associated transfer equipment First, the LCLL process digests (leaches) finely ground spent potlining in a dilute caustic solution at around 85° C. for about one hour. Then, Alcan adds NaOH in a plugflow reactor at about 180° C. and 160 psig to destroy the cyanide in the leach solution in about one additional hour of processing while producing sodium fluoride. Finally, Alcan adds more caustic (generally, lime) to the remaining fluoride liquor for a third hour of treatment in equipment comparable to aluminum smelter wet scrubbers to produce calcium fluoride and a recyclable, caustic leach solution. The LCLL process requires a significant capital expenditure for the processing equipment.

The Adrien process uses five stages to recover calcium fluoride, aluminum fluoride suitable for smelting, and a disposal, carbonaceous, solid waste from the spent potliner. Adrien leaches the crushed potliner, washes the solid residue with two acid washes using $NH_4F$ or another fluoroacid, and, finally, uses a water wash.

SUMMARY OF THE INVENTION

The method of the present invention is a hydrometallurgical process that detoxifies spent aluminum potliners to produce a solid waste suitable for landfill disposal. The process destroys hazardous cyanides and polynuclear aromatics and converts hazardous fluorides to insoluble florspars in a single charge to a reactor involving calcium and iron processing stages. The method initially reacts crushed potliners with a calcium chloride/hydrochloric acid ($CaCl_2$/HCl) leach mill solution at elevated temperatures and pressures. Then, the method involves oxidation of the PNAs with a strongly acidic $FeCl_3$ leach mill solution in an oxygen-containing environment at elevated temperature and pressure. By "strongly acidic," I mean at a pH of less than or about 2.0, and, generally, at a pH of about 0.2–0.5 or lower. The reactions preferably occur at 90–120° C. and 70–90 psi, as described in greater detail in the Detailed Description. Following completion of the leach, I adjust the pH of the reaction liquor (with calcium additions, generally) to precipitate the iron at about pH 3.2. These reactions produce a disposable solid waste and a recyclable reaction liquor (the leach mill solution).

Detoxifying spent potliners removes hazardous metals and polynuclear aromatics (PNAs) to allow the landfill disposal of a solid waste residue. I also believe that it destroys cyanides by converting then to carbon dioxide and nitrogen. The method, preferably, comprises (a) crushing the spent potliners; (b) hydrometallurgically processing (i.e., leaching) a slurry of the crushed potliners in a reactor to place the metals in solution, to complex the fluorides as florspar, and to decompose the polynuclear aromatics (PNAs) and cyanides; (c) precipitating the metals from the solution to form a solid waste in the reactor; (d) separating the precipitated solid waste from the solution; and (e) disposing of the solid waste in a landfill. I add an effective amount of iron to the crushed potliners, if they lack iron, having found that iron will destroy the PNAs in my acidic leach conditions. I carry out the process in successive stages in the same reaction vessel. I treat the reaction liquor further to remove heavy metals and recycle it as a leach mill solution for forming the reaction slurry with fresh potliner, thereby minimizing the waste products and making the process economically and environmentally attractive.

In some cases, I complete the process by washing the solids from the reactor with one or more applications of acetic acid to ensure the complete destruction of the PNAs.

At the same time I destroy the cyanides and convert the complex fluorides to insoluble florspar by reacting the slurry of the finely crushed potliner (minus ⅛ in) in a calcium chloride/hydrochloric acid leach mill solution at a pulp density of about 30–40%. I make the slurry as thick as possible while allowing it to be readily pumped and processed; 40% pulp density is the maximum density I normally use. I add iron powder to the slurry at a concentration of about 5–10% by weight based on the weight of the potliner. I initially oxidize the slurry in a titanium pressure vessel for about one hour at a pH of about 6.0 and at about 90° C. and 70 psig. At the conclusion of this initial oxidation, the cyanides are destroyed (they enter solution during the ball milling of the slurry so that the solid waste even at that stage is essentially free from cyanides), and the fluorides are fixed with calcium in an insoluble waste.

The cyanides enter solution, I believe, during ball milling of the potliner with a calcium chloride solution (pH 7–12) without giving off cyanide gas. With PNAs present in the potliner (which is common), I must lower the pH of the milled potliner with sulfuric acid to carry out a combination reaction at about 120° C. and 90 psi in the presence of iron to destroy the PNAs and cyanides.

Then, I lower the pH in the same reactor following the initial oxidation usually by adding $H_2SO_4$ (or another suitable acid) to achieve a pH of at least about 0.2 or below. The $H_2SO_4$ reacts with $CaCl_2$ to produce HCl and hydrated gypsum ($CaSO_4$). The gypsum precipitates and maintains a negative water balance for the reaction (i.e., water is consumed in the gypsum hydrate so that liquid wastes are not created in the reaction and the solution is deficient in water). HCl reacts with iron, if present in effective amount, or with iron powder that I usually need to add to produce $FeCl_3$ and hydrogen gas. I vent the reactor continuously with a compressed air purge to remove the hydrogen safely. The leach solution becomes a $CaCl_2$—HCl—$FeCl_3$ leach mill solution, that reacts with the polynuclear aromatics (PNAs) at a temperature of about 120° C. and 80–90 psig in an oxidizing atmosphere for about two hours to destroy the PNAs to leave only insoluble PNAs at low concentration. The heavy metals enter solution during this oxidation. The cyanides in solution are converted to carbon dioxide and nitrogen, I believe, in this oxidizing atmosphere.

With the heavy metals from the potliner now in solution, I raise the pH by adding calcium to precipitate all the iron. Precipitation occurs around pH 3.2. Then, I treat the reaction liquor to meet disposal standards (0.37 ppm Pb; 0.014 ppm Be; and 0.19 ppm Cd) for the solid waste. Treatment involves filtering the liquor from the solid residue. I prefer to add powdered zinc, calcium oxide, or both to the filtrate to remove the heavy metals in a solid that is rich in zinc and the heavy metals. The treated liquor is suitable for recycling as the leach mill solution. The zinc-rich solid requires further treatment before I can dispose it. Generally, I recycle it until there are sufficient concentrations of metals in the zinc-rich solid for recovery as salable products.

DETAILED DESCRIPTION OF A PREFERRED EMBODIMENT

A $CaCl_2$/HCl leach mill solution reacts with spent potliners from aluminum smelting in the presence of iron at 90–120°C. and 70–90 psig with a final pH for the reaction liquor of about 0.2–2.0 or below to produce a landfill disposable solid waste and a recyclable reaction (leach mill) liquor. The reaction destroys the hazardous cyanides (to carbon dioxide and nitrogen, I believe) and PNAs and complexes the hazardous fluorides as florspars to allow the solids exiting the reactor (i.e., the majority of the spent potliner) to be disposed of in landfills. The hydrometallurgical process of the present invention, thereby, essentially eliminates the cyanides, fluorides, and PNAs as shown in the tables that follow.

In my preferred method, I crush and grind spent potliners to produce a fine powder (minus ⅛ in) that I slurry with a $CaCl_2$/HCl leach mill solution and, if necessary, with an effective amount of iron powder to produce a slurry having a pH initially above 6.0 and a pulp density of about 30–40%. I oxidize this slurry for about one hour in a titanium pressure vessel at about 90–120° C. and 70–90 psig to destroy the cyanides and to complex the fluorides present in the spent potliner. After the initial oxidizing step, I treat the potliners for about two additional hours in the same reactor at about 120° C. and about 80–90 psig in an oxidizing atmosphere after lowering the pH to about 0.2–0.5 or below. Often I wait to add the iron powder until this second processing stage. Details concerning the leach mill solution, the reactions, and the processing equipment are provided in PCT Publication WO 96/23905 with respect to the hydrometallurgical processing of flue dust (i.e., the EAFD process) to recover the available base metals. I incorporate this publication by reference. The reactions effectively destroy the cyanides and PNAs and apparently convert the fluorides to disposal florspar. I filter the disposable solid waste from the reaction liquor and add zinc powder and calcium oxide (or another basic calcium compound as a source of lime) to replenish the leach mill solution (with the precipitation of a zinc-rich solid containing the remaining heavy metals). The disposable solid waste is mainly carbon, silicon, and gypsum. If $CaCO_3$ is added instead of CaO as the source of lime (caustic), then $CO_2$ must be vented from the reactor. Some nitorgen and $CO_2$ is produced with the destruction of the cyanides as well. The reactions occur in the same vessel sequentially, eliminating transfer stages for the hazardous materials The process is relatively quick, simple, and robust, satisfying all environmental regulations. The feedstocks are readily available and are inexpensive. By robust, I mean that the reactions are tolerant to variations in the concentrations of materials in the spent aluminum potliners allowing their treatment without significant adjustments of the feedstocks.

Tables 1 summarizes typical results I have achieved by processing the spent aluminum potliners:

TABLE 1

| Element | Concentration before treatment (ppm) | Concentration after treatment (ppm) | Standard TCLP (mg/l) |
|---|---|---|---|
| Fluoride, free | 5 | 2 | 48 |
| Cyanides, Amenable ppm | 11.1 | <0.5 | 30 |
| Cyanides as total CN | 25.6 | <0.5 | 590 |
| Acenaphthylene | <1.65 | <3.4 | |
| Acenaphthene | <1.65 | <4.95 | 3.4 |
| Anthracene | 2.020 | <3.4 | 3.4 |
| Benzo(A)Anthracene | 24.7 | <3.4 | 3.4 |
| Benzo(A)Pyrene | 28.5 | <1.35 | 3.4 |
| Benzo(B)Fluoranthene | 55.2 | <4.95 | 6.8 |
| Benzo(G,H,I)Perylene | 24.6 | <1.8 | 1.8 |
| Benzo(K)Fluoranthene | 55.2 | <4.95 | 6.8 |
| Chrysene | 27.2 | <3.4 | 3.4 |
| Dibenzo(A,H)Anthracene | 8.49 | <1.35 | 8.2 |
| Fluoranthene | 42.4 | <3.4 | 3.4 |
| Fluorene | <1.65 | <4.95 | |
| Indeno(1,2,3-C,D)Pyrene | 18.9 | <3.4 | 3.4 |
| Naphthalene | <1.65 | <4.95 | |
| Phenanthrene | 17.1 | <4.95 | 3.6 |
| Pyrene | 31.0 | <4.95 | 8.2 |

Table 2 summarizes the typical results I have achieved using my preferred process in which I add iron powder to the slurry. I destroy cyanides and complex fluorides as insoluble florspar by reacting a slurry of the finely crushed potliner (minus ⅛ in) in a calcium chloride/hydrochloric acid ($CaCl_2$/HCl) leach mill solution at a pulp density of about 30–40%. I add iron powder to the slurry at a concentration of about 5–10% by weight based upon the weight of the potliner. I oxidize the slurry in a titanium pressure vessel for about one hour at about 90° C. and 70 psig. The cyanides are destroyed, often in the ball milling of the slurry, and the fluorides are fixed to an insoluble waste with calcium.

I lower the pH in the same reactor following the initial oxidation by adding $H_2SO_4$ (or another suitable acid) to achieve a pH of at least about 0.2 or below. The $H_2SO_4$ reacts with $CaCl_2$ to produce hydrated gypsum ($CaSO_4$) that precipitates and maintains a negative water balance for the reaction (i.e., water is consumed in the gypsum hydrate so that liquid wastes are not created in the reaction. HCl reacts with the iron powder in this step to produce $FeCl_3$ and hydrogen gas. I vent the reactor continuously with a compressed air purge to remove the hydrogen safely. The leach solution contains $CaCl_2$, HCl, and $FeCl_3$, that react with the polynuclear aromatics (PNAs) in the spent potliner at a temperature of about 120° C. and 80 psig in an oxidizing atmosphere for about two hours. The heavy metals enter solution during this oxidation. I raise the pH to precipitate the iron at about pH 3.2 by adding calcium in the form of CaO, $CaCO_3$, $Ca(OH)_2$, or a combination thereof. I filter a solid waste from the reaction liquor and wash the solid waste with water, adding the water to the reaction liquor. I can dispose of the solid waste in a landfill.

With the heavy metals in solution, I filter the reaction liquor from the solid waste to meet disposal standards (0.37 ppm Pb; 0.014ppm Be; and 0.19 ppm Cd) in the solid waste. Then, I treat the filtrate by adding powdered zinc, calcium oxide, or both to remove the heavy metals in a solid that is rich in zinc and the heavy metals. The treated liquor is suitable for recycling as the leach mill solution. The zinc-rich solid requires further treatment before I can dispose it. It, too, can be recycled until there are sufficient metals in the zinc-rich solid for recovery as salable products. One treatment would be to add it to the feedstock identified in the EAFD treatment process identified earlier.

TABLE 2

Goldendale Plant #8

| Polynuclear Aromatic | Treatment Standard (ppm) | Initial Concentration (ppm) | Test Results (ppm) |
|---|---|---|---|
| Acenaphthene | 3.4 | <330 | <1.65 |
| Anthacene | 3.4 | <330 | <1.65 |
| Benzo(A)Pyrene | 3.4 | 286 | <1.65 |
| Benzo(B)Fluoranthene | 3.4 | 546 | <0.45 |
| Benzo(G,H,I)Perylene | 6.8 | <350 | <1.65 |
| Benzo(K)Fluoranthene | 6.8 | <330 | <1.65 |
| Benzo(A)Anthracene | 1.8 | <330 | 4.99 |
| Chrysene | 3.4 | 454 | <1.65 |
| Dibenzo(A,H)Anthracene | 8.2 | <90 | <0.45 |
| Fluoranthene | 3.4 | 638 | <1.65 |
| Indeno(1,2,3-C,D)Pyrene | 3.4 | <360 | <1.80 |
| Phenanthrene | 5.6 | <330 | <1.65 |
| Pyrene | 8.2 | 600 | <1.65 |

If the potliners do not contain sufficient iron (and they usually do not), I add iron in sufficient quantities to destroy the polynuclear aromatics.

Tables 3 and 4 summarize the typical results I achieved in reducing the cyanides and fluorides with the initial oxidation before reducing the pH with $H_2SO_4$.

TABLE 3

| CYANIDE TEST | EPA STANDARD | HEAD (ppm) | BALL MILL 15 min (ppm) | REACTOR 2 hrs (ppm) |
|---|---|---|---|---|
| #1 | 590 | 3786 | 356 | <0.5 |
| #2 | 590 | 846 | 86 | 5.24 |
| #3 | 590 | 590 | <25 | 0.65 |
| L11-29-A | 590 | 17980 | 103 | <0.5 |

TABLE 4

| FLUORIDE TEST | EPA STANDARD | HEAD (ppm) | REACTOR 2 hrs (ppm) |
|---|---|---|---|
| L11-29-A | 48 | 385 | 7 |
| #7 | 48 | 1014 | 16 |
| #2 | 48 | 244 | 35 |
| L12-10-A | 48 | 1080 | 8 |

These results show that the process of the present invention is effective at treating potliners having widely varying initial concentrations of pollutants. The process is versatile and applicable to all spent potliner trials I have encountered without the need to adjust the input concentrations.

The data in Table 5 illustrates the destruction of cyanide that I have achieved in trials with potliner treated with a straight calcium chloride solution without an acid addition (so PNAs were not destroyed). In these trials, the pH of the reaction liquors were all above pH 10.0. I allowed the reaction to run for about 1 hour at about 50 psig with oxygen overpressure in each case, but varied the $CaCl_2$ concentration and the reactor temperature.

TABLE 5

| % $CaCl_2$ in Solution | <CN> in feed (ppm) | <CN> after ball milling (ppm) | Reactor Temperature | | |
|---|---|---|---|---|---|
| | | | 80° C. CN (ppm) | 100° C. CN (ppm) | 125° C. CN (ppm) |
| 5% | 2250 | 2200 | 717 | 540 | 353 |
| 10% | 2250 | 1800 | 736 | 400 | 311 |
| 15% | 2250 | 1650 | 599 | 550 | 240 |
| 25% | 2250 | 447 | 125 | 35 | <25 |
| 35% | 2250 | 446 | 57 | <25 | <25 |
| 50% | 2250 | 235 | <25 | <25 | <25 |

<CN> means the concentration of cyanide in parts per million (ppm).

This data show that more complete destruction occurred as the concentration of calcium chloride increased as well as when the reactor temperature increased. The EPA standard for cyanide is currently 590 ppm, so the majority of these tests proved quite successful.

Under reactor conditions suitable for destroying the PNAs, the cyanides also are destroyed to acceptable EPA levels. I believe that the destruction is complete, converting the cyanides to carbon dioxide and nitrogen.

I had similar results with trials that I ran for Boeing and Phillips cyanide solutions, as shown in Table 6. In these trials, I ran the reactor at about 50 psig with oxygen overpressure at about 120° C. for about 1 hour. The reactor liquor had a pH above 10.0, so no cyanide gas was emitted during the milling or reaction.

TABLE 6

| % CaCl$_2$ in Solution | Initial <CN> (ppm) | Final <CN> (ppm) |
|---|---|---|
| 35% | 36,125 | 45 |
| 25% | 8,959 | 109 |
| 15% | 4,534 | 296 |
| 15% | 6774 | 348 |

I believe that the cyanides were converted to carbon dioxide and nitrogen during this reaction. Higher concentration of calcium chloride are more effective.

While I have described preferred embodiments of the process of the present invention and have provided examples of its operation, those skilled in the art will readily recognize alternatives, variations, alterations, or modifications of the process that might be made to the invention without departing from the inventive concept. Accordingly, interpret the description and claims broadly to protect the inventive concept The description of the preferred embodiments and the examples are given to illustrate the invention rather than to limit it. Only limit the invention as is required to distinguish the invention from the prior art.

I claim:

1. A method for detoxifying spent aluminum potliners having hazardous cyanides, fluorides, polynuclear aromatics, or a mixture thereof, comprising the steps of:
   (a) reacting crushed spent aluminum potliner with a leach mill solution made from CaCl$_2$ and HCl to produce an insoluble solid residue substantially free from cyanides, fluorides, or polynuclear aromatics and a reaction liquor;
   (b) separating a solid waste from the reaction liquor; and
   (c) recycling the reaction liquor to treat additional crushed potliner.

2. The method of claim 1 further comprising adding iron to the potliner to facilitate destruction of the polynuclear aromatics by the generation of FeCl$_3$ in the reaction liquor.

3. A method for detoxifying spent aluminum potliners, having hazardous metals and polynuclear aromatics, to allow their disposal as solid waste, comprising the steps of
   (a) crushing the spent potliners;
   (b) hydrometallurgically processing the crushed potliners in a reactor with a leach mill solution made from ingredients adapted for decomposing polynuclear aromatics in the crushed potliners to form a slurry having a pulp density of less than about 40% to decompose the polynuclear aromatics while producing a solid waste substantially free from hazardous cyanides, fluorides, or polynuclear aromatics, optionally, adding an effective amount of iron to the crushed potliners to facilitate destruction of the polynuclear aromatics by the generation of FeCl$_3$ if the potliners lack iron;
   (c) precipitating a solid waste in the reactor from the slurry;
   (d) then, filtering the solid waste from a filtrate of the slurry; and
   (e) disposing of the solid waste in a landfill.

4. The method of claim 3 further comprising recycling the filtrate from step (d) as all or a portion of the leach mill solution for treating additional spent potliners.

5. The method of claim 3 wherein the leach mill solution includes CaCl$_2$.

6. A method for treating spent aluminum potliner to reduce the levels of polynuclear aromatics to permit landfill disposal of a treated spent potliner solid waste, comprising the steps of
   (a) leaching a slurry of the potliner in air at an elevated temperature and pressure, the slurry being acidic and containing ferric chloride and being adapted to reduce the levels of polynuclear aromatics; and
   (b) filtering the slurry to produce a filtrate and a solid waste wherein, optionally, the solid waste is further washed with water that is added to the filtrate.

7. A method for destruction of polynuclear aromatics in spent aluminum potliners, comprising the step of reacting a slurry of crushed potliner with a leach mill solution containing CaCl$_2$, HCl, and FeCl$_3$ at an elevated temperature and pressure in an oxidizing environment.

8. The method of claim 7 further comprising the steps of:
   (a) adding about 5–10 wt % iron powder based upon the weight of the potliner to the slurry; and
   (b) reacting the slurry at a pH of at least about 6.0, a temperature of about 90° C., and a pressure of about 70 psig to destroy cyanides and to convert fluorides to florspars prior to destroying the polynuclear aromatics.

9. A slurry containing cyanides, fluorides, and polynuclear aromatics suitable for processing hydrometallurgically to remove the cyanides, fluorides, and polynuclear aromatics, comprising crushed spent aluminum potliner and 5–10 wt % iron powder based on the weight of the spent potliner, the iron being sufficient in amount to facilitate destruction of the polynuclear aromatics by generation of FeCl$_3$ in the slurry.

10. A solution for destroying polynuclear aromatics in spent aluminum potliners, comprising potliner and a mixture made from CaCl$_2$, HCl, and FeCl$_3$ effective for destroying the polynuclear aromatics in the potliner.

11. A method for treating spent aluminum potliners, comprising the steps of
   (a) in a slurry of finely crushed potliner, destroying cyanides and complexing fluorides as florspars by oxidizing the slurry in a leach mill solution made from calcium chloride and hydrochloric acid at a pulp density of about 30–40% with iron powder at a concentration of about 5–10% of the weight of the potliner at about 90° C. and 70 psig;
   (b) lowering the pH following the oxidation by adding H$_2$SO$_4$ or another suitable acid to achieve a pH so that HCl reacts with the iron powder to produce FeCl$_3$ in a CaCl$_2$—HCl solution and hydrogen gas;
   (c) venting the hydrogen;
   (d) reacting the CaCl$_2$, HCl, and FeCl$_3$ solution with the polynuclear aromatics to destroy the polynuclear aromatics in the spent potliner at a temperature of about 120° C. and at a pressure of about 80 psig in an oxidizing atmosphere and to cause heavy metals in the potliners to enter solution to create a liquor and a solid residue;
   (e) filtering the liquor from the solid residue;
   (f) disposing the solid residue in a landfill.

12. A method for destroying polynuclear aromatics in spent aluminum potliner, comprising the steps of:
   (a) reacting the potliner with HCl and FeCl$_3$ under oxidizing conditions to destroy the polynuclear aromatics; and
   (b) venting hydrogen generated in step (a).

13. A method for treating spent aluminum potliner to create a landfill disposable solid waste that is essentially free from hazardous cyanides, fluorides, and polynuclear aromatic hydrocarbons, comprising the steps of
   (a) oxidizing the potliner with a leach mill solution made from CaCl$_2$ and HCl to remove the cyanides and fluorides from a potliner solution;

(b) adjusting the pH and the iron concentration of the potliner solution produced in step (a) to provide sufficient iron to produce a leach mill solution made from HCl and $FeCl_3$.

(c) oxidizing the polynuclear aromatic hydrocarbons with the leach mill solution of step (b); and (d) separating a landfill disposable solid waste from the solution following step (c).

14. The method of claim 13 further comprising recycling the solution separated in step (d) to treat additional potliner.

15. The method of claim 13 further comprising the step of washing the solid waste with acetic acid.

16. The method of claim 1 further comprising the step of washing the solid waste with acetic acid.

17. A method for destroying cyanides in spent aluminum potliner comprising the steps of:

(a) mixing crushed spent aluminum potliners containing cyanides with a solution made from an effective amount calcium chloride and other ingredients suitable for destroying the cyanides in the presence of the calcium chloride (b) reacting the mixture to destroy the cyanides.

18. The method of claim 17 wherein mixing involves ball milling the potliner with the solution, and wherein the method further comprises the step of recovering a landfill-disposable solid waste.

19. The method of claim 17 wherein the reacting step occurs at a pressure of at least about 50 psig, and at a temperature of at least about 80° C. in an atmosphere that includes oxygen.

20. The method of claim 19 wherein the pH of the mixture during step (a) is 10.0 or above.

21. The method of claim 18 wherein the concentration of calcium chloride mixed with the potliner is at least about 15 wt %.

* * * * *